United States Patent
Hao et al.

(10) Patent No.: US 10,374,939 B2
(45) Date of Patent: Aug. 6, 2019

(54) HOP CONSTRAINED MAXIMUM FLOW WITH SEGMENT ROUTING

(71) Applicants: Fang Hao, Morganville, NJ (US);
Murali Kodialam, Marlboro, NJ (US);
T. V. Lakshman, Marlboro, NJ (US)

(72) Inventors: Fang Hao, Morganville, NJ (US);
Murali Kodialam, Marlboro, NJ (US);
T. V. Lakshman, Marlboro, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 161 days.

(21) Appl. No.: 15/605,790

(22) Filed: May 25, 2017

(65) Prior Publication Data

US 2018/0343189 A1 Nov. 29, 2018

(51) Int. Cl.
*H04L 12/26* (2006.01)
*H04L 12/721* (2013.01)
*H04L 12/733* (2013.01)

(52) U.S. Cl.
CPC .......... *H04L 45/122* (2013.01); *H04L 45/123* (2013.01); *H04L 43/0882* (2013.01)

(58) Field of Classification Search
CPC ... H04L 43/0882; H04L 43/50; H04L 45/122; H04L 45/123
USPC .................................. 370/238, 254
See application file for complete search history.

(56) References Cited

U.S. PATENT DOCUMENTS

2005/0265258 A1* 12/2005 Kodialam ............... H04L 45/04
370/254

* cited by examiner

*Primary Examiner* — Melvin C Marcelo
*Assistant Examiner* — Natali Pascual Peguero
(74) *Attorney, Agent, or Firm* — Kramer Amado, P.C.

(57) ABSTRACT

A method of determining a maximum flow on a network path using segment routing, the method including establishing a segment graph, establishing underlying dual weights on the segment graph, computing the dual weights from the segment graph, finding a minimum dual weight path not having more than a predetermined number of hops, augmenting a flow on the dual weight path, and updating the dual weights on the underlying segment graph.

12 Claims, 6 Drawing Sheets

FIG. 4A
$w(e) = 1 \quad \forall e \neq (5,7)$
$w(5,7) = 2$
FIG. 4B
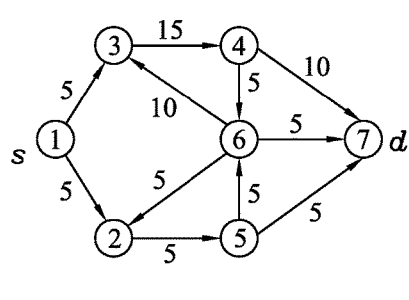
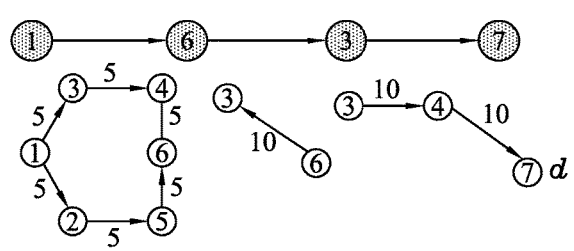

Algorithm 1 Maximum $h$-hop Segment Flow

Input: Graph $G = (V,E)$, Link weights $w(e)$, Source $s$, Destination $d$, Hop count restriction $h$

Output: Maximum $h$-hop Segment Flow between $s$ and $d$ $\pi(e) \dfrac{\delta}{c(e)} \; \forall e$ $D(\pi) = m\delta \leftarrow 0$ $t \leftarrow 0$ $A_t \leftarrow 0$ while ( $D(\pi) < 1$ ) do

$t \leftarrow t + 1$

Compute $W(q) = \sum_{e \in SP(q)} F_q(e)\pi(e)$ for all links $q \in G^S$

Let $P^* = \text{Arg min}_{P \in P^h_{sd}} W(P)$

Let $f(e) \; \sum_{q \in P^*} F_q(e)$ for all $e \in E$

Compute $\Delta \leftarrow \min_e \dfrac{c(e)}{f(e)}$

Set $x(P^*) \leftarrow x(P^*) + \Delta$ $A_t \leftarrow A_{t-1} + \Delta$ $\pi_t(e) \leftarrow \pi_{t-1}(e) \left[ 1 + \dfrac{\Delta f(e)}{c(e)} \right] \; \forall e$ $D(\pi_t) = \sum_e c(e) \pi_t(e)$ end

$x(P) \leftarrow x(P) / \log_{1+e} 1/\delta, \forall P$ $\lambda \leftarrow A_t / \log_{1+e} 1/\delta$

FIG. 5

Algorithm 2 Minimum Cost Path in $P_{sd}^h$

---

Input: Segment Graph $G^S$, Link Cost $W(q)$, Source $s$, Destination $d$, Hop Bound $h$
Output: Minimum Cost Path in $P_{sd}^h$
Mincost $m_c = \infty$
  Set $D(v, j) = \infty \; \forall v, 0 \leq j \leq h_p, d(s, 0) = 0$
  $PRED(v, 0) = \emptyset \; \forall v$
  $PRED(S, 0) = s$
  for $j = 1, 2, \ldots, h$ do
      $D(v, j) = D(v, j - 1) \; \forall v$
      $PRED(v, j) = PRED(v, j - 1) \; \forall v$
      for $(\forall q = (u, w) \in G^S)$ do
         if $(D(u, j - 1) + W(q) < D(w, j))$ then
            $D(w, j) = D(u, j - 1) + W(q)$
            $PRED(w, j) + u$
         end
      end
  end
  $P^* = \emptyset$
  $u = v = d$
  $k = h$
  while $(v \neq s)$ do
      $v \leftarrow PRED(u, k)$
      if $(v \neq u)$ then
         $P^* \leftarrow P^* \cup (v, u)$
      end
      $k \leftarrow k - 1$
  end

HOP CONSTRAINED MAXIMUM FLOW WITH SEGMENT ROUTING

TECHNICAL FIELD

Embodiments described herein include segment routing in high performance telecommunications networks.

A fundamental operation in networks is routing packets from source to destination. In internet protocol (IP) networks, routing may be done along shortest paths by a routing protocol like open shortest path first (OSPF) or intermediate system to intermediate system (IS-IS). These shortest path based routing protocols ensure loop-free delivery of packets. When using shortest path routing, all traffic between a given source (S) and destination (D) is routed on the shortest path between the source and destination. If the traffic is greater than expected, it is not possible to shift this traffic along alternate paths even if spare bandwidth is available elsewhere in the network. This is one of the major drawbacks of shortest path routing. Increasingly traffic has to be routed through middle boxes like load balancers and firewalls. Also, it is not possible to exert fine grained control on the paths if shortest path routing is used.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

Various embodiments relate to a method of determining a maximum flow on a network path using segment routing, the method including establishing a segment graph, establishing underlying dual weights on the segment graph, computing the dual weights from the segment graph, finding a minimum dual weight path not having more than a predetermined number of hops, augmenting a flow on the dual weight path, and updating the dual weights on the underlying segment graph.

The dual weight may be computed by summing $\Sigma_{e \in SP(q)} F_q(e)\pi(e)$, where q is a link on the segment graph, Fq(e) is the amount of flow on one link in the segment graph, and $\pi(e)$ represents a weight associated with link e on the underlying graph.

A total amount of flow generated on link e in the physical topology may be due to a flow of $\Delta$ on $P^*f(e)=\Sigma_{q \in P^*}F_q(e)$, where P* is a new path and Fq(e) is the amount of flow on one link in the segment graph.

The method may include calculating a new dual objective value $D(\pi)=\Sigma_e c(e)\pi(e)$.

The method of determining a maximum flow on a network path using segment routing may be repeated as long as $D(\pi) \leq 1$ and terminates the first time the weight of the shortest path $D(\pi) > 1$.

Various embodiments may also relate to a non-transitory computer readable medium comprising program instructions for causing a computer processor to perform a method, the machine-readable storage medium including instructions for establishing a segment graph, instructions for establishing underlying dual weights on the segment graph, instructions for computing the dual weights from the segment graph, instructions for finding a minimum dual weight path not having more than a predetermined number of hops, instructions for augmenting a flow on the dual weight path, and instructions for updating the dual weights on the underlying segment graph.

Embodiments may include a non-transitory machine-readable storage medium, wherein the dual weight may be computed by summing $\Sigma_{e \in SP(q)} F_q(e)\pi(e)$, where q is a link on the segment graph, Fq(e) is the amount of flow on one link in the segment graph, and $\pi(e)$ represents a weight associated with link e on the underlying graph.

Embodiments may include a non-transitory machine-readable storage medium, wherein a total amount of flow generated on link e in the physical topology may be due to a flow of $\Delta$ on $P^*f(e)=\Sigma_{q \in P^*}F_q(e)$, where P* is a new path and Fq(e) is the amount of flow on one link in the segment graph.

Embodiments may include a non-transitory machine-readable storage medium, including instructions for calculating a new dual objective value $D(\pi)=\Sigma_e c(e)\pi(e)$.

Embodiments may include a non-transitory machine-readable storage medium, wherein the method of determining a maximum flow on a network path using segment routing may be repeated as long as $D(\pi) \leq 1$ and terminates the first time the weight of the shortest path $D(\pi) > 1$.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

FIGS. 4A and 4B illustrate another physical topology with the link capacities in accordance with embodiments described herein;

FIG. 5 illustrates a maximum h-hop segment flow algorithm in accordance with embodiments described herein; and FIG. 6 illustrates a minimum cost path algorithm in accordance with embodiments described herein.

DETAILED DESCRIPTION

Figure 1A:
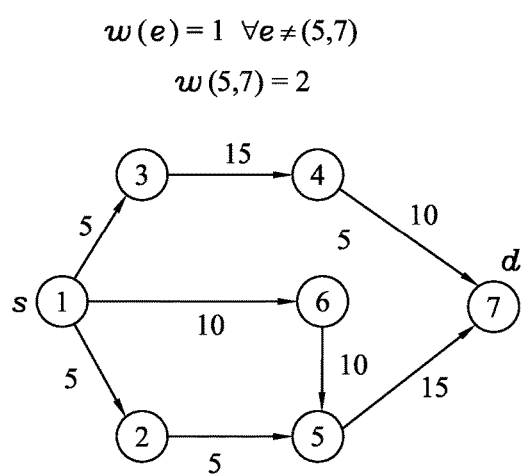
FIGS. 1A-1C illustrate routing connections and flow in accordance with embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated. Descriptors such as "first," "second," "third," etc., are not meant to limit the order of elements discussed, are used to distinguish one element from the next, and are generally interchangeable.

Segment routing provides a flexible routing mechanism in internet protocol multi-protocol label switching (IP-MPLS) networks. A price that is paid for flexibility in segment routing is overhead incurred in specifying the segment end-points in a packet header. Because a MPLS label handling mechanism may be used to process the segment routing header at the nodes, there are typically practical restrictions on the label stack depth. This constraint on the label stack depth is equivalent to restricting the number of segments in any path on which traffic is routed.

When a connection is routed in a network, all packets belonging to this connection will take the same path between its end points. This is done in order to ensure that packets arrive to a destination in the same sequence in which they were transmitted (apart from the occasional lost packets). Therefore in connection routing an objective is to determine a single path between the connection endpoints that has sufficient bandwidth to carry the connection. Flows are defined as an aggregation of connections.

Figure 1B:
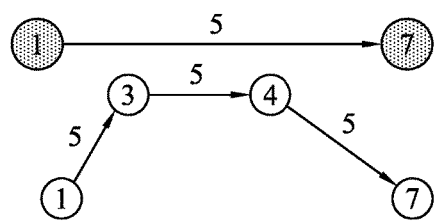
Figure 1C:
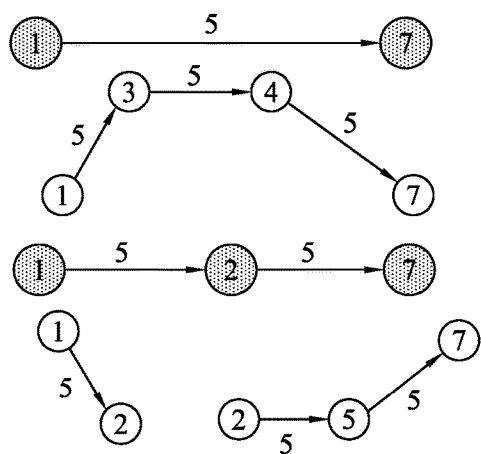

FIGS. 1A-1C illustrate routing and connection flows in accordance with embodiments described herein. When routing a flow, a goal may not be restricted to finding a single path for the flow. Instead, a set of paths may be found between the flow end points such that the sum of the bandwidth along the set of paths equals the total bandwidth for the flow. In FIG. 1A, a physical topology is illustrated with the link capacities shown next to the link. The link weight w(e)=1 for all links except link (5,7) that has a weight of 2. One goal is to route connections and flows between source node 1 and destination node 7. The hop limit h=2. As illustrated in FIG. 1B, a two-hop connection with bandwidth 5 is configured. This includes of one segment (1,7) in the segment graph (illustrated in FIG. 2) and the path in the physical topology is 1-3-4-7 with a combined weight of 3. Each path in the segment graph includes multiple links. A link on the segment graph is represented by q. According to q in the segment graph, there is an underlying shortest path in the physical topology. FIG. 1C illustrates a two-hop flow of 10 units between nodes 1 and 7. The flow is on two different paths in the segment graph, 1-3-4-7 and 1-2-5-7. Typical network planning problems where an objective is to determine if there is sufficient bandwidth in the network to carry a specified amount of traffic between different source destination pairs are flow routing problems. Both for bandwidth connection and flow problems, the routing paths have to satisfy the hop restrictions imposed by segment routing. Embodiments described herein consider a Hop Constrained Maximum Flow Problem where the objective is to determine the maximum amount of flow that can be sent on hop constrained paths between a given source-destination (s,d) pair. The output for the hop constrained maximum flow problem is a set of hop constrained paths between the source and destination along with the flows sent on each path.

Various notations are used herein. A network G=(N,E) may be given where the nodes are the routers connected by directed links. Link e has an Internet Gateway Protocol (IGP) link weight w(e) and capacity c(e). The network uses segment routing and the label stack depth is restricted to be at most h. Therefore any path from source to destination can have at most h segments. Note that when there are multiple shortest paths between nodes, the network can split traffic across these equal cost paths (ECMP). The set SP(u,v) includes of all links that belong in any shortest path. $F_w(e)$ denotes the fraction of flow on link e when one unit of flow is sent from u to v. In order to explicitly model the segments, the segment graph GS of the given network G may be constructed. The segment graph is an overlay network on the physical topology G. Corresponding to link q=(u,v) in the segment graph is the set of all links in the set SP(u,v). The set of links may be denoted in the underlying graph corresponding to link q in the segment graph by SP(q).

Figure 2A:
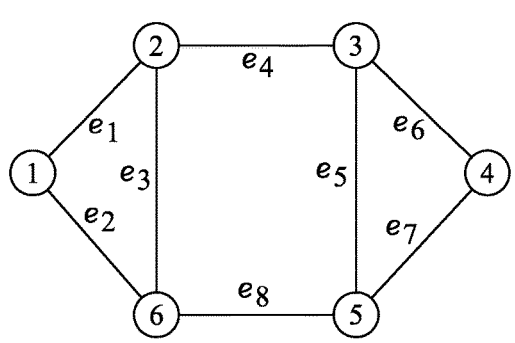
FIGS. 2A-2D illustrate physical and segment cover topologies in accordance with embodiments described herein.
Figure 2B:
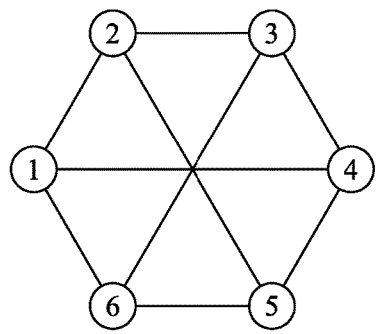
Figure 2C:
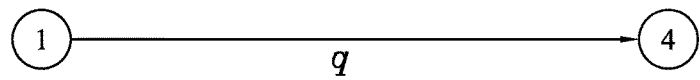
Figure 2D:
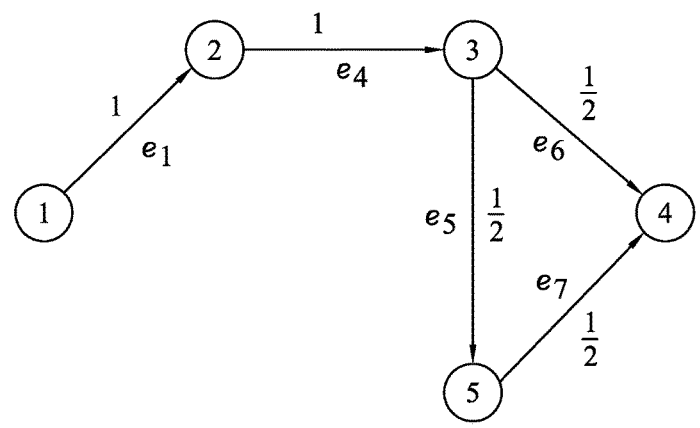

FIGS. 2A-2C illustrate physical and segment cover topologies in accordance with embodiments described herein. FIG. 2A illustrates the physical topology, FIG. 2B illustrates the segment graph and FIG. 2C illustrates links in the physical topology corresponding to link q=(1,4) in the segment graph. Given a segment q=(u,v), $F_q(e)=F_w(e)$ may be used as a shorthand to represent the fraction of flow on link e when one unit of flow is sent on segment q. FIG. 2 illustrates the values of Fq(e) for all links e for segment q=(1,4). FIG. 2D illustrates a corresponding shortest path SP(q) in the physical typology. The number next to link 2 is fq(e).

Hop constrained maximum flow will be described in accordance with embodiments described herein, and routing flows between nodes s and d. One difference between routing a connection and routing a flow is that a flow includes many connections and therefore can be routed along multiple paths.

Figure 3A:
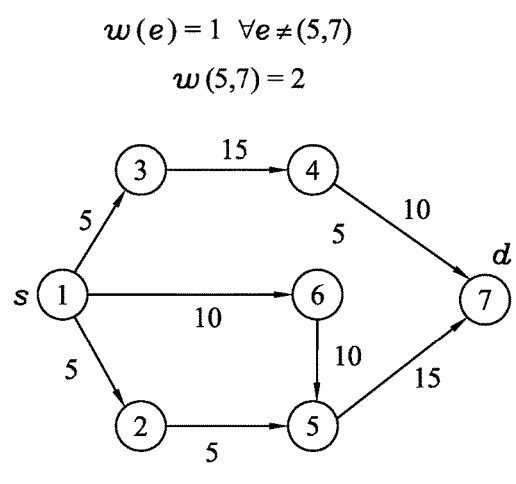
FIGS. 3A and 3B illustrate a physical topology with the link capacities in accordance with embodiments described herein.
Figure 3B:
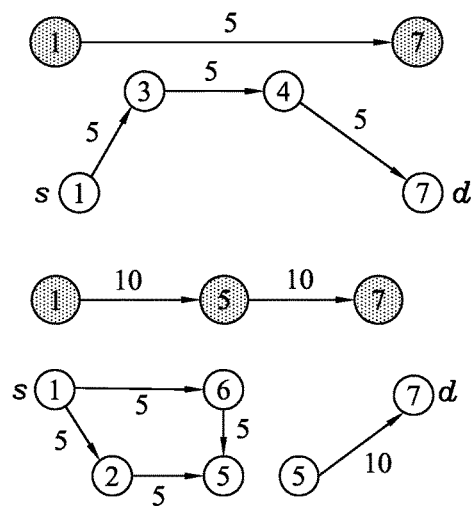

FIGS. 3A and 3B illustrate a physical topology with link capacities in accordance with embodiments described herein. As illustrated in FIG. 3A, link weights are all one except link (5,7) that has a weight of 2. As illustrated in FIG. 3B, one goal may be to determine a maximum 2-hop flow between nodes 1 and 7. The shortest path between 1 and 7 may be unique and is the path 1-3-4-7 with a weight of 3. There are equal cost paths (1-2-5 and 1-6-5) between nodes 1 and 5 each with a weight of 2. The 2-hop maximum flow is 15 and the optimum solution may be to send a flow of 5 units in the segment graph on the edge (1,7) and 10 units on the path 1-5-7 in the segment graph. Note that the flow is split on multiple paths in the segment graph and each of these paths in turn can split traffic on an equal cost shortest path. One embodiment discussed herein may determine a maximum amount of hop constrained flow that can be routed between a given source node s and destination node d. Unlike a problem of routing a connection which had the property that the optimum path is non-intersecting, an optimum path or set of paths that achieve the maximum flow can be intersecting.

FIGS. 4A and 4B illustrate another physical topology with the link capacities in accordance with embodiments described herein. As illustrated in FIG. 4A, the source node is 1 and the destination node is 7. All link weights are set to one except link (5,2) which has weight of 2. The maximum 1 hop flow is 5 along the path 1-3-4-7. The maximum flow 3 hop path is illustrated in FIG. 4B. Note that link (3,4) is used twice. This is the unique solution. The fact that the same link may be used multiple times makes the problem more difficult than the problem of determining the hop widest path problem.

The maximum amount of flow that a link q in the segment graph can carry is given by $$\min_{e \in SP(q)} \frac{c(e)}{F_q(e)}.$$

This may be compared to a capacity of link q for the maximum width path which is $\min_{e \in SP(q)} c(e)$. The amount of flow that can be sent on path P in the segment graph is upper limited by $$\min_{e \in SP(q)} \frac{c(e)}{\sum_{q \in P} F_q(e)}.$$

This is due to the fact that a link e in the physical topology will be used $\Sigma_{q \in P} F_q(e)$ times. In general, flow will be routed from s to d on multiple paths. $P_{sd}^h$ is used to denote the set of paths between nodes s and d in the segment graph that has at most h hops. P denotes a generic path in the network. If x(P) denotes the amount of flow sent on path $P \in P_{sd}^h$, then X(P) has to satisfy $$\sum_{P \in P_{sd}^h} \sum_{q \in P} F_q(e) x(P) \le c(e) \ \forall \ e.$$

The h-hop constrained maximum segment flow problem can be written as the following linear program:

$$\max \sum_{P \in P_{sd}^h} x(P) \quad (1)$$

$$\sum_{P \in P_{sd}^h} \sum_{q \in P} F_q(e) x(P) \le c(e) \ \forall \ e$$

$$x(P) \ge 0 \ \forall \ P$$

All paths P may be defined on the segment graph and not on the physical topology. In order to develop a fully polynomial time approximation scheme (FPTAS) for this problem, the dual to the linear programming problem may be written. Associating a dual variable π(e) with constraint (1) the problem may be written as:

$$\min \sum_{e \in E} c(e) \pi(e) \quad (2)$$

$$\sum_{q \in P} \sum_{e \in SP(q)} F_q(e) \pi(e) \ge 1 \ \forall \ P \ \pi(e) \ge 0 \ \forall \ e$$

FIG. 5 illustrates a maximum h-hop segment flow algorithm in accordance with embodiments described herein. In writing the dual variable, note that $F_q(e)=0$ if $e \notin SP(q)$. The primal-dual algorithm illustrated in FIG. 5 to solve this problem may work in the following manner.

The value of π(e) is initialized to $$\frac{\delta}{c(e)}$$

where δ is a parameter chosen to obtain the required accuracy guarantee. For each link in an underlying topology, there π(e) is a weight associated with link e. All the links have some dual weight.

The algorithm operates in multiple steps where in each step the algorithm does the following operations.

The dual weight W(q) of each link q in the segment graph is defined as $W(q) = \Sigma_{e \in SP(q)} F_q(e) \pi(e)$. Since the value of $F_q(e)=0$ if $e \notin SP(q)$, it is faster to compute $W(q) = \Sigma_{e \in SP(q)} F_q(e) \pi(e)$. Since there are $O(n^2)$ links in the segment graph, the overall computation of the link weights takes $O(n^2 m)$ time. Thus for every link in the segment graph, dual weights are computed. To compute dual weights, $\Sigma_{e \in SP(q)} F_q(e) \pi(e)$ is computed over all e in the shortest path according to the q. There will be π(e) on the underlying graph. Taking a link q on the.

Find the minimum weight h-hop path P* in the segment graph between s and d, where the weight of link q in the segment graph is set to W(q). This computation is done using dynamic programming. The algorithm is shown in FIG. 5. The running time of the algorithm is $O(hn^2)$. The algorithm outputs the path $P^* \in P_{sd}^h$ with minimum weight. This operation may include finding a dual weight path between s and d that does not have more than a predetermined number h hops. Once a minimum base path is determined, flow can be augmented on that base path.

The maximum flow that can be augmented on this path without violating any link capacity in the physical topology may now be found. If a flow of Δ is sent on link q in P*, it will generate a flow of $F_q(e)\Delta$ on link e in the physical topology. Define $f(e) = \Sigma_{q \in P^*} F_q(e)$. The total amount of flow generated on link e in the physical topology due to a flow of Δ on P* is Δf(e). f(e) relates to how much flow will go on link e as a result of sending one unit of flow on path P* which is the minimum dual weight path on the segment graph that does not have more than h hops. The predetermined number of h hops may be specified in an input stage. Note that the same link in the physical topology can appear multiple times when routing on the segment graph. The following relationship, $\Delta f(e) \le c(e)$, should hold for all links in the physical topology. Therefore, the maximum flow that can be sent on P* without violating any link capacity is $$\Delta = \max_{e} \frac{c(e)}{f(e)}.$$

The computation of Δ takes time O(hm). C(e) is the capacity of flow on a link e and f(e) is the unit flow. With delta computed in a previous step, the dual weights of all the links in the underlying graph will change. Computing D being c(e)*π(e), if the result is less than one, the loop runs again.

A flow of Δ is augmented on path P* and the dual variables on the links in the physical topology are recomputed. The following value is used:

$$\pi(e) \leftarrow \pi(e)\left[1 + \epsilon \frac{\Delta f(e)}{c(e)}\right] \ \forall \ e$$

A new dual objective value $D(\pi) = \Sigma_e c(e)\pi(e)$ is calculated. This takes O(m) time.

The algorithm iterates through the above steps as long as $D(\pi) \le 1$ and terminates the first time the weight of the shortest path $D(\pi) > 1$.

Regarding the algorithm illustrated in FIG. 5, the computation of the minimum cost h-hop constrained path is a step in the primal-dual algorithm. The h-hop constrained minimum cost path problem can be solved in O(hm) time in a graph with m links. For completeness, the algorithm MINCOST (s,h) is given which computes the h-hop constrained mincost path from from a given node s. Since all paths are computed on the segment graph which has $O(n^2)$ links, the running time of the algorithm is $O(hn^2)$. The correctness proof of the algorithm is straightforward and is omitted.

FIG. 6 illustrates a minimum cost path algorithm in accordance with embodiments described herein. Regarding the algorithm illustrated in FIG. 6, given a set of dual weights $\pi$, let $D(\pi) = \Sigma_{e \in E} c(e) \pi(e)$ denote the dual objective function value and let $$\Gamma(\pi) = \min_{P \in \mathcal{P}} \sum_{\in P} \sum_{e \in SP(q)} F_q(e)\pi(e).$$

The dual problem is equivalent to solving the following optimization problem:

$$\min_{\pi \geq 0} \frac{D(\pi)}{\Gamma(\pi)}.$$

The primal-dual algorithm iterates between the primal and dual. Let $A_t$ and $\pi_t$ denote the primal and dual solution at the end of step t. The algorithm terminates in iteration L when $D(\pi_L) > 1$.

Let $\pi_{t-1}$ denote the weight function at the beginning of iteration t of the while loop, and let $A_{t-1}$ be the primal objective function value up to the end of iteration t−1. Suppose the algorithm terminates after iteration L. The foregoing lemma upper limits the value of $\Gamma(\pi)$ at the end of every iteration.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

The invention claimed is:

1. A method of determining a maximum flow on a network path using segment routing, the method comprising:
    establishing a segment graph;
    establishing underlying dual weights on the segment graph;
    computing the dual weights from the segment graph;
    finding a minimum dual weight path not having more than a predetermined number of hops;
    augmenting a flow on the dual weight path; and
    updating the dual weights on the underlying segment graph until a dual objective value exceeds a threshold based on link capacity c(e) and link weight $\pi(e)$.

2. The method of claim 1, wherein the dual weight is computed by summing $\Sigma_{e \in SP(q)} F_q(e)\pi(e)$, where q is a link on the segment graph, Fq(e) is an amount of flow on one link in the segment graph, and $\pi(e)$ represents the link weight associated with link e on the underlying segment graph.

3. The method of claim 2, further comprising:
    initializing $\pi(e)$ to $\delta/c(e)$, wherein $\delta$ is a parameter chosen to obtain a required accuracy guarantee.

4. The method of claim 1, wherein a total amount of flow generated on link e in a physical topology due to a flow of $\Delta$ on $P^*f(e) = \Sigma_{q \in P^*} F_q(e)$, where $P^*$ is a new path and Fq(e) is the amount of flow on one link in the segment graph.

5. The method of claim 1, further comprising:
    calculating a new dual objective value $D(\pi) = \Sigma_e c(e)\pi(e)$.

6. The method of claim 5, wherein the method of determining the maximum flow on the network path using segment routing is repeated as long as $D(\pi) \leq 1$ and terminates the first time the weight of the shortest path $D(\pi) > 1$.

7. A non-transitory machine-readable medium comprising program instructions for causing a computer processor to perform a method, the non-transitory machine-readable storage medium comprising:
    instructions for establishing a segment graph;
    instructions for establishing underlying dual weights on the segment graph;
    instructions for computing the dual weights from the segment graph;
    instructions for finding a minimum dual weight path not having more than a predetermined number of hops;
    instructions for augmenting a flow on the dual weight path; and
    instructions for updating the dual weights on the underlying segment graph until a dual objective value exceeds a threshold based on link capacity c(e) and link weight $\pi(e)$.

8. The non-transitory machine-readable storage medium of claim 7, wherein the dual weight is computed by summing $\Sigma_{e \in SP}(q) F_q(e)\pi(e)$, where q is a link on the segment graph, Fq(e) is an amount of flow on one link in the segment graph, and $\pi(e)$ represents the link weight associated with link e on the underlying segment graph.

9. The non-transitory machine-readable storage medium of claim 8, further comprising:
    instructions for initializing $\pi(e)$ to $\delta/c(e)$, wherein $\delta$ is a parameter chosen to obtain a required accuracy guarantee.

10. The non-transitory machine-readable storage medium of claim 7, wherein a total amount of flow generated on link e in a physical topology due to a flow of $\Delta$ on $P^*f(e) = \Sigma_{q \in P^*} F_q(e)$, where $P^*$ is a new path and Fq(e) is the amount of flow on one link in the segment graph.

11. The non-transitory machine-readable storage medium of claim 7, further comprising:

instructions for calculating a new dual objective value $D(\pi)=\Sigma_e c(e)\pi(e)$.

12. The non-transitory machine-readable storage medium of claim 11, wherein the method of determining the maximum flow on the network path using segment routing is repeated as long as $D(\pi) \leq 1$ and terminates the first time the weight of the shortest path $D(\pi) > 1$.

* * * * *